United States Patent
Lin

(10) Patent No.: US 10,782,910 B2
(45) Date of Patent: Sep. 22, 2020

(54) METHODS FOR INTERNAL DATA MOVEMENTS OF A FLASH MEMORY DEVICE AND APPARATUSES USING THE SAME

(71) Applicant: Silicon Motion, Inc., Zhubei, Hsinchu County (TW)

(72) Inventor: Sheng-Liu Lin, Hsinchu (TW)

(73) Assignee: SILICON MOTION, INC., Zhubei, Hsinchu County (TW)

( * ) Notice: Subject to any disclaimer, the term of this patent is extended or adjusted under 35 U.S.C. 154(b) by 210 days.

(21) Appl. No.: 16/015,703

(22) Filed: Jun. 22, 2018

(65) Prior Publication Data

US 2019/0095123 A1 Mar. 28, 2019

Related U.S. Application Data

(60) Provisional application No. 62/561,824, filed on Sep. 22, 2017.

(30) Foreign Application Priority Data

Jan. 16, 2018 (TW) .............................. 107101541 A

(51) Int. Cl.
*G06F 3/06* (2006.01)
*G06F 13/16* (2006.01)
(52) U.S. Cl.
CPC ............ *G06F 3/0647* (2013.01); *G06F 3/061* (2013.01); *G06F 3/0653* (2013.01); *G06F 3/0659* (2013.01); *G06F 3/0679* (2013.01); *G06F 13/1668* (2013.01)
(58) Field of Classification Search
None
See application file for complete search history.

(56) References Cited

U.S. PATENT DOCUMENTS

| 9,348,749 | B2 * | 5/2016 | Choi | ................... | G06F 12/0269 |
| 9,465,731 | B2 | 10/2016 | Sinclair et al. | | |
| 10,552,058 | B1 * | 2/2020 | Jadon | ..................... | G06F 3/0679 |
| 2014/0215129 | A1 * | 7/2014 | Kuzmin | .............. | G06F 12/0246 |
| | | | | | 711/103 |
| 2015/0261797 | A1 * | 9/2015 | Alcantara | ............. | G06F 16/217 |
| | | | | | 707/813 |

FOREIGN PATENT DOCUMENTS

| CN | 103761988 A | 4/2014 |
| CN | 105745628 B | 9/2017 |
| TW | 201543227 A | 11/2015 |
| TW | I520153 B | 2/2016 |

OTHER PUBLICATIONS

Taiwanese Office Action and Search Report for Taiwanese Application No. 107101541, dated Apr. 30, 2019, with partial English translation.

* cited by examiner

*Primary Examiner* — Denise Tran
(74) *Attorney, Agent, or Firm* — Birch, Stewart, Kolasch & Birch, LLP

(57) ABSTRACT

The invention introduces a method for internal data movements of a flash memory device, performed by a host, at least including the following steps: generating an internal movement command when detecting that a usage-status for an I/O channel of a solid state disk (SSD) has met a condition; and providing the internal movement command to direct the SSD to perform an internal data-movement operation in the designated I/O channel.

16 Claims, 13 Drawing Sheets

METHODS FOR INTERNAL DATA MOVEMENTS OF A FLASH MEMORY DEVICE AND APPARATUSES USING THE SAME

CROSS-REFERENCE TO RELATED APPLICATIONS

This application claims the benefit of priority to U.S. Provisional Application Ser. No. 62/561,824, filed on Sep. 22, 2017; and Patent Application No. 107101541, filed in Taiwan on Jan. 16, 2018; the entirety of which is incorporated herein by reference for all purposes.

BACKGROUND

The disclosure generally relates to flash memory and, more particularly, to methods for internal data movements of a flash memory device and apparatuses using the same.

Flash memory devices typically include NOR flash devices and NAND flash devices. NOR flash devices are random access—a host accessing a NOR flash device can provide the device any address on its address pins and immediately retrieve data stored in that address on the device's data pins. NAND flash devices, on the other hand, are not random access but serial access. It is not possible for NOR to access any random address in the way described above. Instead, the host has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word. Actually, NAND flash devices usually read or program several pages of data from or into memory cells. In reality, the NAND flash device always reads from the memory cells and writes to the memory cells complete pages. After a page of data is read from the array into a buffer inside the device, the host can access the data bytes or words one by one by serially clocking them out using a strobe signal.

An open-channel Solid State Drive (SSD) system includes a SSD (a device) and a host and does not have a flash translation layer implemented on the device, but instead leaves the management of the physical solid-state storage to the host. Open-Channel SSDs differ from a traditional SSD in that they expose the internal operating parameters (e.g. including device capabilities, internal parallelism, etc.) of the SSD to the host and allow the host to manage it accordingly. However, only three basic types of access commands are provided in the Open-Channel SSD specification: block erase; data read; and data write. The host consumes excessive bandwidth of the Open-Channel SSD interface to the device to perform an access procedure requiring a series of data reads and writes, such as a Garbage Collection (GC), a wear leveling, etc.

Thus, it is desirable to have methods for internal data movements of a flash memory device and apparatuses using the same to overcome the aforementioned constraints.

SUMMARY

In view of the foregoing, it may be appreciated that a substantial need exists for methods and apparatuses that mitigate or reduce the problems above.

In an aspect of the invention, the invention introduces a method for internal data movements of a flash memory device, performed by a host, at least including: generating an internal movement command when detecting that a usage-status for an I/O channel of a solid state disk (SSD) has met a condition; and providing the internal movement command to direct the SSD to perform an internal data-movement operation in the designated I/O channel.

In another aspect of the invention, the invention introduces an apparatus for internal data movements of a flash memory device, at least including a host. The host generates an internal movement command when detecting that a usage-status for an I/O channel of a SSD has met a condition; and provides the internal movement command to direct the SSD to perform an internal data-movement operation in the designated I/O channel.

In another aspect of the invention, the invention introduces a method for internal data movements of a flash memory device, performed by a processing unit of a SSD, at least including: obtaining an internal movement command generated by a host, which directs the SSD to perform an internal data-movement operation in a designated I/O channel and comprises a memory address pointing to a first data-movement record of a data buffer; obtaining data-movement records from the memory address of the data buffer, wherein each comprises a source location; determines a destination location of the I/O channel for each source location; driving a flash controller to request the I/O channel for performing a CopyBack procedure to move user data of each source location of the I/O channel to the determined destination location; and replying to the host with the determined destination location for each source location.

In another aspect of the invention, the invention introduces an apparatus for internal data movements of a flash memory device, at least including a flash controller; and a processing unit coupled to the flash controller. The processing unit obtains an internal movement command generated by a host, wherein the internal movement command directs a SSD to perform an internal data-movement operation in a designated I/O channel and comprises a memory address pointing to a first data-movement record of a data buffer; obtains data-movement records from the memory address of the data buffer, wherein each comprises a source location; determines a destination location of the I/O channel for each source location; drives the flash controller to request the I/O channel for performing a CopyBack procedure to move user data of each source location of the I/O channel to the determined destination location; and replies to the host with the determined destination location for each source location.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
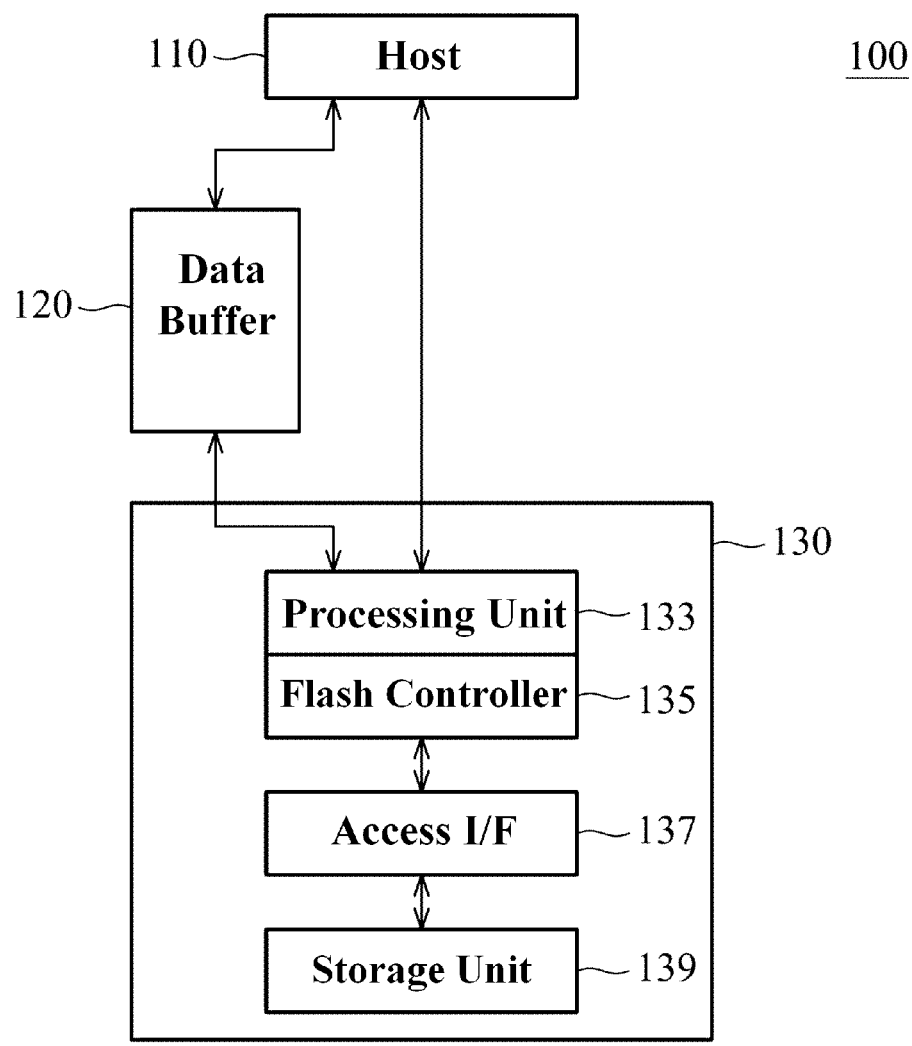
FIG. 1 is the architecture of a Solid State Drive (SSD) system according to an embodiment of the invention.

FIG. 1 is the architecture of a Solid State Drive (SSD) system 100 according to an embodiment of the invention. The SSD system 100 includes a host 110, a data buffer 120 and a SSD 130. The host 111 may create a queue, a storage mapping table (may also be referred to as a Logical-To-Physical L2P table) and usage records under the necessity of an operation. The system architecture may be practiced in a personal computer (PC), a laptop PC, a tablet computer, a mobile phone, a digital camera, a digital recorder, or other electronic consumer products. The data buffer 120, the queue and the storage mapping table may be practiced in particular regions of a Random Access Memory (RAM). The host 110 may communicate with the Open-Channel SSD 130 through the Open-Channel SSD Non-Volatile Memory express (NVMe) interface (protocol). The host 110 can be implemented in numerous ways, such as with general-purpose hardware that is programmed to perform the functions recited herein. The host 210 may contain at least an Arithmetic Logic Unit (ALU) and a bit shifter. The ALU is multifunctional device that can perform both arithmetic and logic function. The Open-Channel SSD NVMe specification, for example, version 1.2 published in April, 2016, supports multiple I/O channels and each I/O channel is related to Logical Unit Numbers (LUNs) to correspond to respective storage sub-units of the storage unit 139. In the Open-Channel SSD NVMe specification, the host 110 integrates with a Flash Translation Layer (FTL) that had once been implemented on a device to optimize the workload. The conventional FTL maps Logical Block Addresses (LBAs) recognized by the host or a file system to physical addresses of the storage unit 139 (also called logical-to-physical mappings). In the Open-Channel SSD NVMe specification, the host 110 may instruct the Open-Channel SSD 130 to store user data in a physical address of the storage unit 139. Thus, the host 110 is responsible for maintaining the storage mapping table to record which physical address of the storage unit 139 that the user data of each LBA is actually stored.

The Open-Channel SSD 130 at least includes a processing unit 133. The processing unit 133 may communicate with the host 110 following the Open-Channel SSD NVMe protocol for receiving data access commands including physical addresses and instruct a flash controller 135 to perform erases, data reads or writes according to the data access commands.

The Open-Channel SSD 130 may contain the flash controller 135, an access interface and the storage unit 139 and the flash controller 135 may communicate with the storage unit 139 using a Double Data Rate (DDR) protocol, such as Open NAND Flash Interface (ONFI), DDR toggle, or others. Specifically, the flash controller 135 of the Open-Channel SSD 130 writes user data into a designated address (a destination address) of the storage unit 139 and reads user data from a designated address (a source address) thereof through the access interface 137. The access interface 137 may issue control signals, such as Chip Enable (CE), Address Latch Enable (ALE), Command Latch Enable (CLE), Write Enable (WE), etc. for coordinating command and data transfer between the flash controller 135 and the storage unit 139. The processing unit 133 and the flash controller 135 may be implemented in separate chips or integrated with a single chip.

In a system boot, the host 110 may obtain relevant operation parameters, such as total numbers of blocks, bad blocks and I/O channels, a latency or others, under the necessity of an operation.

Figure 2:
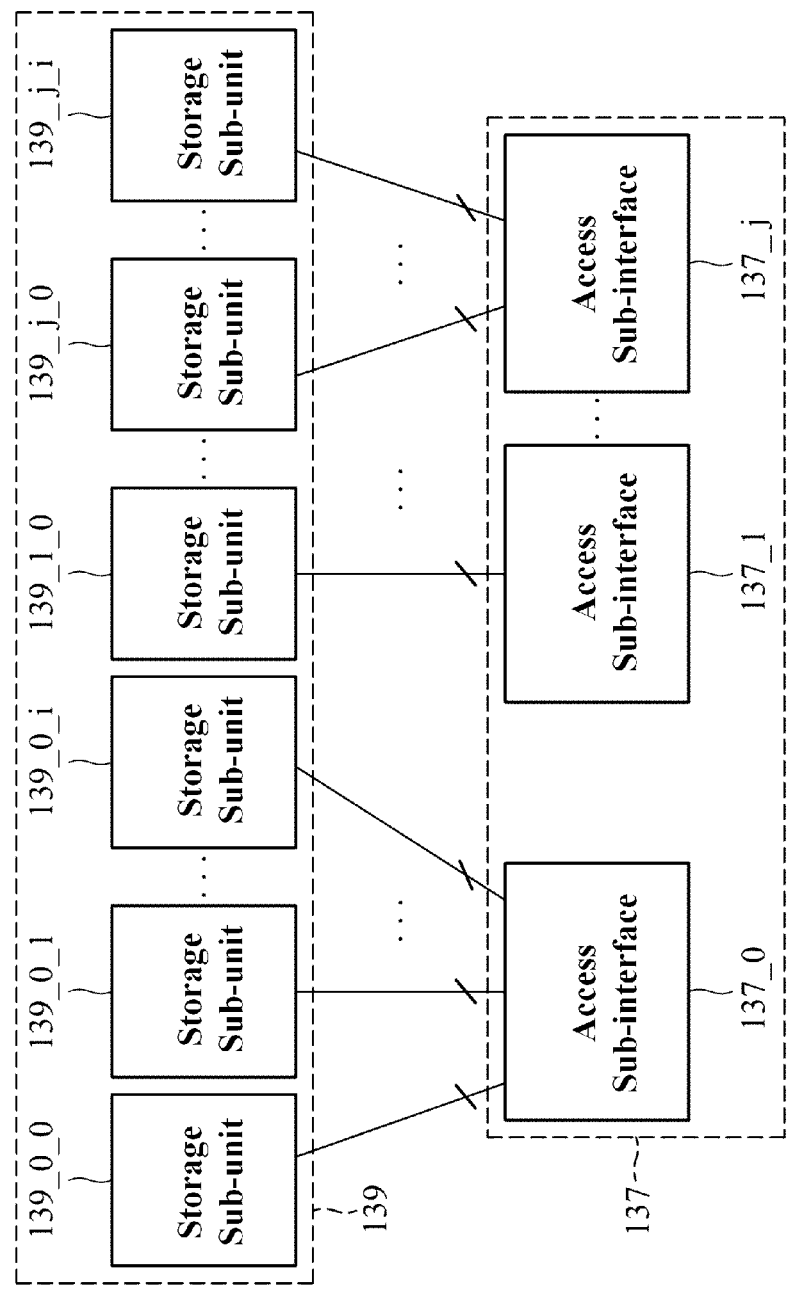
FIG. 2 is a schematic diagram illustrating interfaces to storage units of a flash storage according to an embodiment of the invention.
Figure 3:
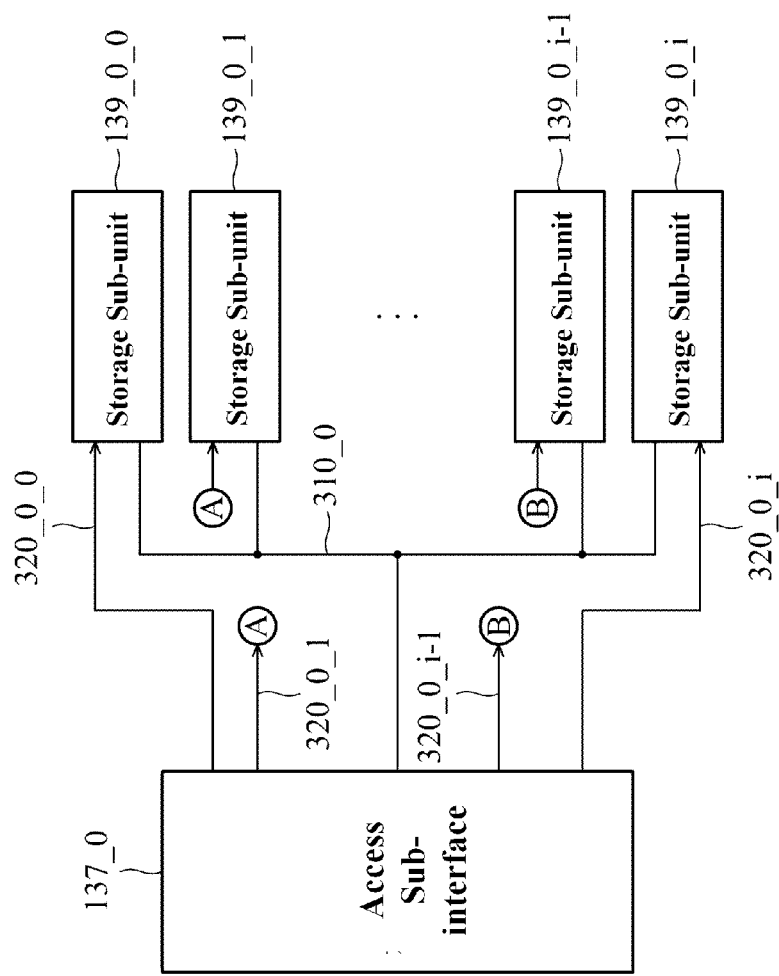
FIG. 3 is a schematic diagram depicting connections between one access sub-interface and multiple storage sub-units according to an embodiment of the invention.

The storage unit 139 may contain multiple storage sub-units and each storage sub-unit may use a respective access sub-interface to communicate with the flash controller 135. One or more storage sub-units may be packaged in a single die. FIG. 2 is a schematic diagram illustrating interfaces to storage units of a flash storage according to an embodiment of the invention. The flash memory may contain j+1 access sub-interfaces 137_0 to 137_j and each access sub-interface may connect to i+1 storage sub-units. Each access sub-interface and the connected storage sub-units behind may be referred to as a I/O channel collectively. That is, i+1 storage sub-units may share the same access sub-interface. For example, assume that the Open-Channel SSD 130 contains 4 I/O channels (j=3) and each I/O channel connects to 4 storage sub-units (i=3): The Open-Channel SSD 130 has 16 storage sub-units 139_0_0 to 139_0 in total. The flash controller 135 may drive one of the access sub-interfaces 137_0 to 137_j to read data from the designated storage sub-unit. Each storage sub-unit has an independent CE control signal. That is, it is required to enable a corresponding CE control signal when attempting to perform data read or programming from or into a designated storage sub-unit via an associated access sub-interface. It is apparent that any number of I/O channels may be provided in the Open-Channel SSD 130, and each I/O channel may include any number of storage sub-units, and the invention should not be limited thereto. FIG. 3 is a schematic diagram depicting connections between one access sub-interface and multiple storage sub-units according to an embodiment of the invention. The flash controller 135, through the access sub-interface 137_0, may use independent CE control signals 320_0_0 to 320_0_i to select one of the connected storage sub-units 139_0_0 and 139_0_i, and then read data from or program data into the designated location of the selected storage sub-unit via the shared data line 310_0.

Figure 4:
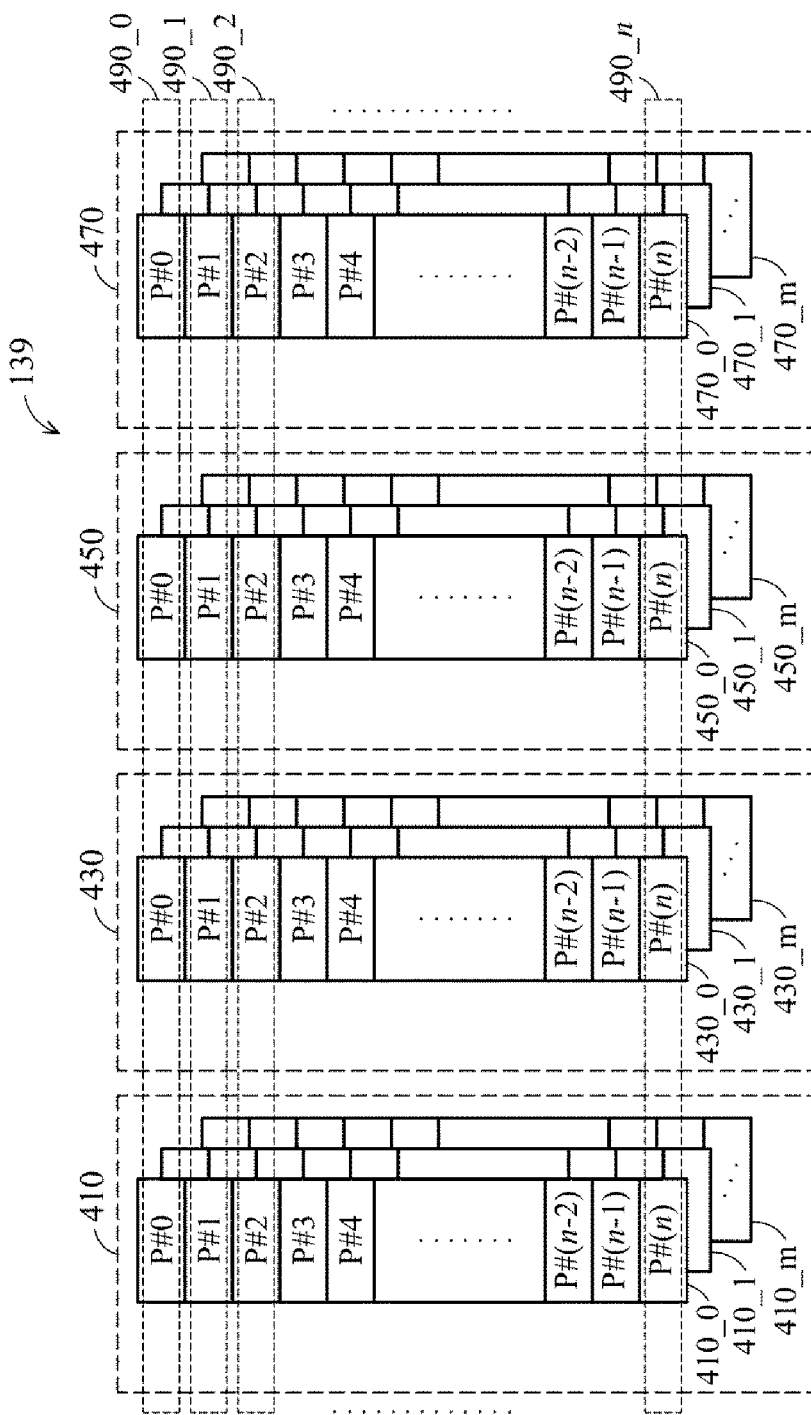
FIG. 4 is a schematic diagram of a storage unit.

FIG. 4 is a schematic diagram of the storage unit 139. The storage unit 139 may include multiple data planes 410_0 to 410_m, 430_0 to 430_m, 450_0 to 450_m and 470_0 to 470_m and each data plane or multiple data planes may be set to one LUN. The data planes 410_0 to 410_m and the shared access sub-interface are called the I/O channel 410, the data planes 430_0 to 430_m and the shared access sub-interface are called the I/O channel 430, the data planes 450_0 to 450_m and the shared access sub-interface are called the I/O channel 450, and the data planes 470_0 to 470_m and the shared access sub-interface are called the I/O channel 470, collectively, in which m may be a power of two $2^n$, such as 1, 2, 4, 8, 16, 32, etc., the I/O channels 410, 430, 450 and 470 may be identified by LUNs. Each of the data planes 410_0 to 470_m may include multiple physical blocks, each physical block may include multiple pages P #0 to P #(n) and each page may include multiple sectors, such as 4, 8 sectors, or more, where n may be set to 767, 1535, or others. Each page may include multiple NAND memory cells and the NAND memory cells may be Single-Level Cells (SLCs), Multi-Level Cells (MLCs), Triple-Level Cells (TLCs) or Quad-Level Cells (QLCs). In some embodiments, when each NAND memory cell is SLC capable of recording two states, the pages P #0 of the data planes 410_0 to 470_0 may virtually form a super page 490_0, the pages P #1 of the data planes 410_0 to 470_0 may virtually form a super page 490_1, and so on. In alternative embodiments, when each NAND memory cell is MLC capable of recording four states, one physical wordline may include pages P #0 (referred to as Most Significant Bit MSB pages) and pages P #1 (referred to as Least Significant Bit LSB pages), and the rest may be deduced by analogy. In further alternative embodiments, when each NAND memory cell is TLC capable of recording eight states, one physical wordline may include pages P #0 (MSB pages), pages P #1 (referred to as Center Significant Bit CSB pages) and pages P #2 (LSB pages), and the rest may be deduced by analogy. In further alternative embodiments, when each NAND memory cell is QLC capable of recording sixteen states, one physical wordline may include MSB, CSB, LSB and Top Significant Bit (TSB) pages.

When the storage unit 139 operates, a page may be the minimum data unit, such as 16 KB, that can be managed or programmed, and the physical address may be represented by a page number. Alternatively, each page may include multiple sectors and the length of each sector may be, for example, 4 KB. A sector may be the minimum data unit that can be managed, and the physical address may be represented by a sector number or an offset that this sector is located in a page. A block is the minimum unit for erasing data.

Physical blocks may be classified into active, data and spare blocks dependent on their usage statuses. An active block is a physical block where user data is programming, that is, in which the End of Block (EOB) information has not been programmed. A data block is a physical block in which user data and the EOB information have been programmed, that is, no user data can be programmed. A spare block can be selected as a candidate of active block and stores no valid user data. Typically, the spare block is erased to become an active block after being selected.

In some embodiments, the physical address that the host 110 sends to the Open-Channel SSD 130 may include information about a LUN, a data plane number, a physical block number, a physical page number and a sector number, etc. to indicate that the user data is to be read or programmed from or into a specified sector of a physical page of a physical block of a physical data plane of a I/O channel. Note that the sector number may be modified by a column number. In alternative embodiments, the physical address that the host 110 sends to the Open-Channel SSD 130 may include information about a LUN, a data plane number, a physical block number, etc. to indicate that a specified physical block of a physical data plane of a I/O channel is to be erased.

Figure 5:
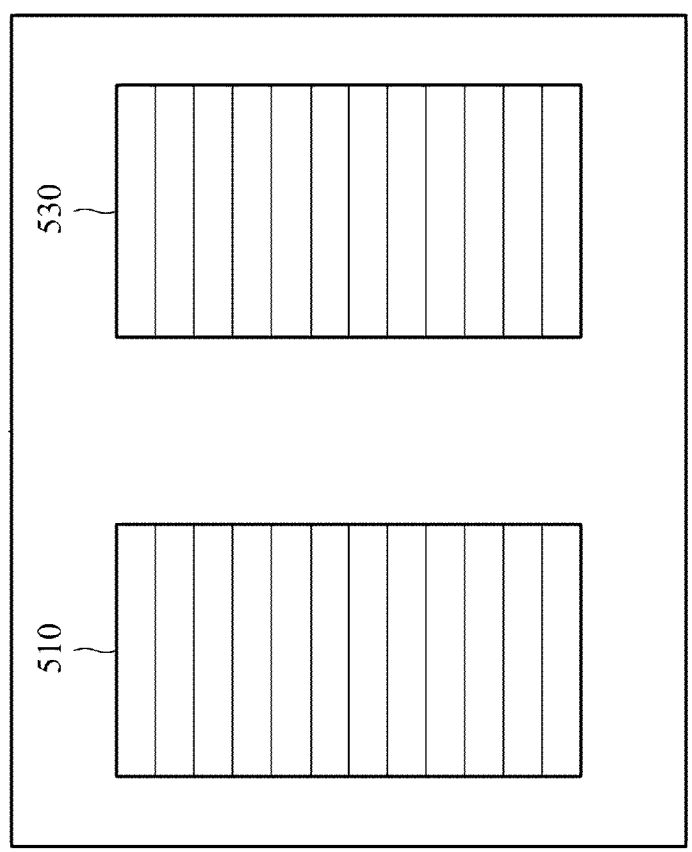
FIG. 5 is a schematic diagram of a command queue.

FIG. 5 is a schematic diagram of a command queue. A queue 115 may include a Submission Queue (SQ) 510 and a Completion Queue (CQ) 530 for temporarily storing host instructions and Completion Elements (CEs), respectively. Each of the SQ 510 and the CQ 530 contains a collection of entries. Each entry of the SQ 510 may store one host command, such as one I/O command (hereinafter referred to as a data access command) or one administration command, and each entry of the CQ 530 stores one CE associated with one data access or administration command, where the functionality of the CE likes a confirmation message. The entries in the collection are kept in order. The principle operations on the collection are the addition of entities to the rear terminal position, known as enqueue, and removal of entities from the front terminal position, known as dequeue. That is, the first command or element added to the SQ 510 or the CQ 530 will be the first one to be removed. The host 110 may write data access commands, such as the erase, read, write commands, or others, into the SQ 510 and the processing unit 133 may read (or fetch) the earliest arrived data access command from the SQ 510 to execute. After an execution of the data access command completes, the processing unit 133 may write a CE into the CQ 350 and the host 110 may read (or fetch) the CE to determine an execution result of the associated data access command.

Figure 6:
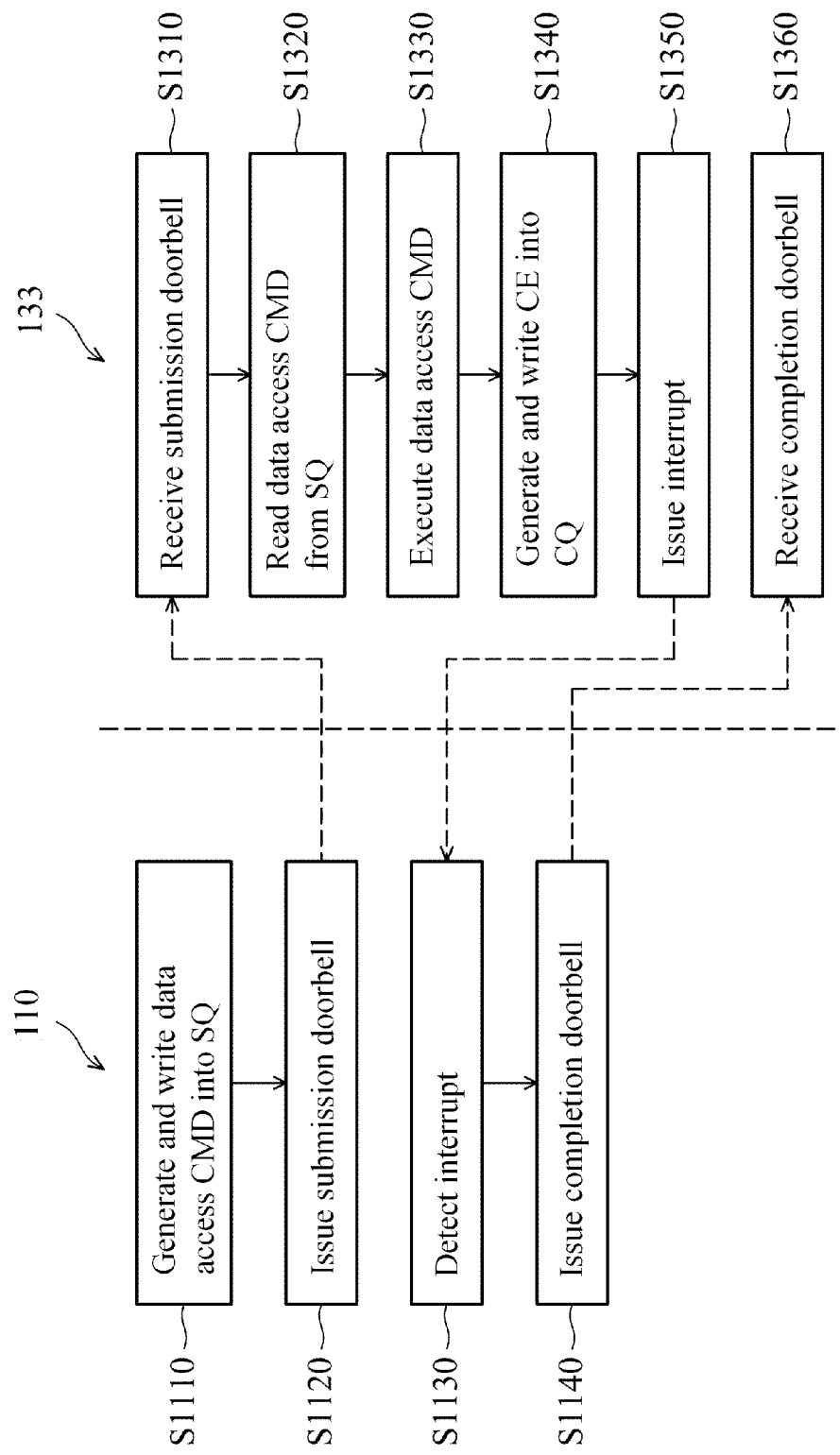
FIG. 6 is a flowchart illustrating a method for executing a data access command (CMD) according to an embodiment of the invention.

FIG. 6 is a flowchart illustrating a method for executing a data access command (CMD) according to an embodiment of the invention. The host 110 may generate and write a data access command (such as, erase, read, write commands, etc.) into the SQ 510 (step S1110), in which contains information about a physical address, where the physical address indicates a particular block, page or sector. Then, the host 110 may issue a submission doorbell to the processing unit 133 (step S1120) to inform the processing unit 133 that a data access command has been written into the SQ 510, and update the value (pointer) pointing to the tail of the SQ 510. After receiving the submission doorbell (step S1310), the processing unit 133 may read the (earliest arrived) data access command from the SQ 510 (step S1320) and drive the flash controller 135 to perform a designated operation (such as a block erase, a data read, a data write, etc.) according to the data access command (step S1330). After the designated operation has been performed completed, the processing unit 133 may generate and write a CE into the CQ 530 (step S1340) to inform the host 110 of information about an execution status for the operation associated with the data access command, and issue an interrupt to the host 110 (step S1350). After detecting the interrupt (step S1130), the host 110 may read the (earliest arrived) CE from the CQ 530 (step S1130), and then, issue a completion doorbell to the processing unit 133 (step S1140). After receiving the completion doorbell (step S1360), the processing unit 133 may update the value pointing to the head of the CQ 530.

In steps S1120 and S1140, the host 110 may set corresponding registers to issue the submission and completion doorbells to the processing unit 133.

One data access command may be issued for processing multiple (for example, 64) transactions of user data. The CE may include an execution reply table of multiple (for example, 64) bits and each bit may indicate an execution result of one corresponding transaction of user data. For example, "0" indicates a success while "1" indicates a failure. The data access command may include an opcode field for storing the type (such as, a block erase, a data read, a data write, etc.) of the data access command. The CE may include a status field for storing an execution status (such as a success, a failure, etc.) of a corresponding data access command. Moreover, since the processing unit 133 may execute the data access commands out-of-order or according to their priorities, the data access commands and the CEs may include command identifier fields, allowing the host 110 to associate each CE with a designated data access command.

For example, since an spare block has to be erased first to become an active block before a data write, the host 110 may write an erase command into the SQ 510 (step S1110) to direct the Open-Channel SSD 130 (specifically, the processing unit 133) to perform an erase operation on a designated spare block of a designated I/O channel. The processing unit 133 may drive the flash controller 135 to perform the designated erase operation in the storage unit 139 through the access interface 137 to deal with the erase command (step S1330). After the erase operation is completed, the processing unit 133 may write a CE into the CQ 530 (step S1340) to inform the host 110 that the corresponding erase operation has been performed completely.

For example, the host 110 may write a read command into the SQ 510 (step S1110) to direct the Open-Channel SSD 130 to read user data from (a designated sector of) a designated physical page of a designated physical block of a designated data plane of a designated I/O channel. The processing unit 133, in dealing with the read command, may drive the flash controller 135 to read user data from a designated physical address of the storage unit 139 through the access interface 137, and store the user data in a region of a data buffer 120 specified in the read command (step S1330). After the read operation is completed, the processing unit 133 may write a CE into the CQ 530 (step S1340) to inform the host 110 that the corresponding read operation has been performed completely.

For example, the host 110 may store user data to be programmed in a region of the data buffer 120 and write a write command into the SQ 510 (step S1110) to direct the Open-Channel SSD 130 to program the user data into a designated physical page of a designated physical block of a designated data plane of a designated I/O channel, in which the write command includes information about an address of the data buffer 120 storing the user data to be programmed. The processing unit 133, in dealing with the write command, may read the user data to be programmed from the designated address of the data buffer 120 and drive the flash controller 135 to program the user data into the designated physical address of the storage unit 139 through the access interface 137 (step S1330). After the write operation is completed, the processing unit 133 may write a CE into the CQ 530 (step S1340) to inform the host 110 that the corresponding write operation has been performed completely.

After numerous accesses, a physical page may include valid and invalid sectors (also referred to as stale sectors), in which the valid sectors store valid user data while the invalid sectors store invalid user data. In some embodiments, when detecting that available space of the storage unit 139 is insufficient, the host 110 may use the aforementioned read command to direct the processing unit 133 to read and collect user data of the valid sectors, and then, use the aforementioned write command to direct the processing unit 133 to program the collected user data into an empty physical page of an spare or active block, thereby making the data block storing no valid user data be able to erase to become an spare block. The data block after being erased may provide space for storing more data. The above steps are referred to as a Garbage Collection (GC) process.

Figure 7:
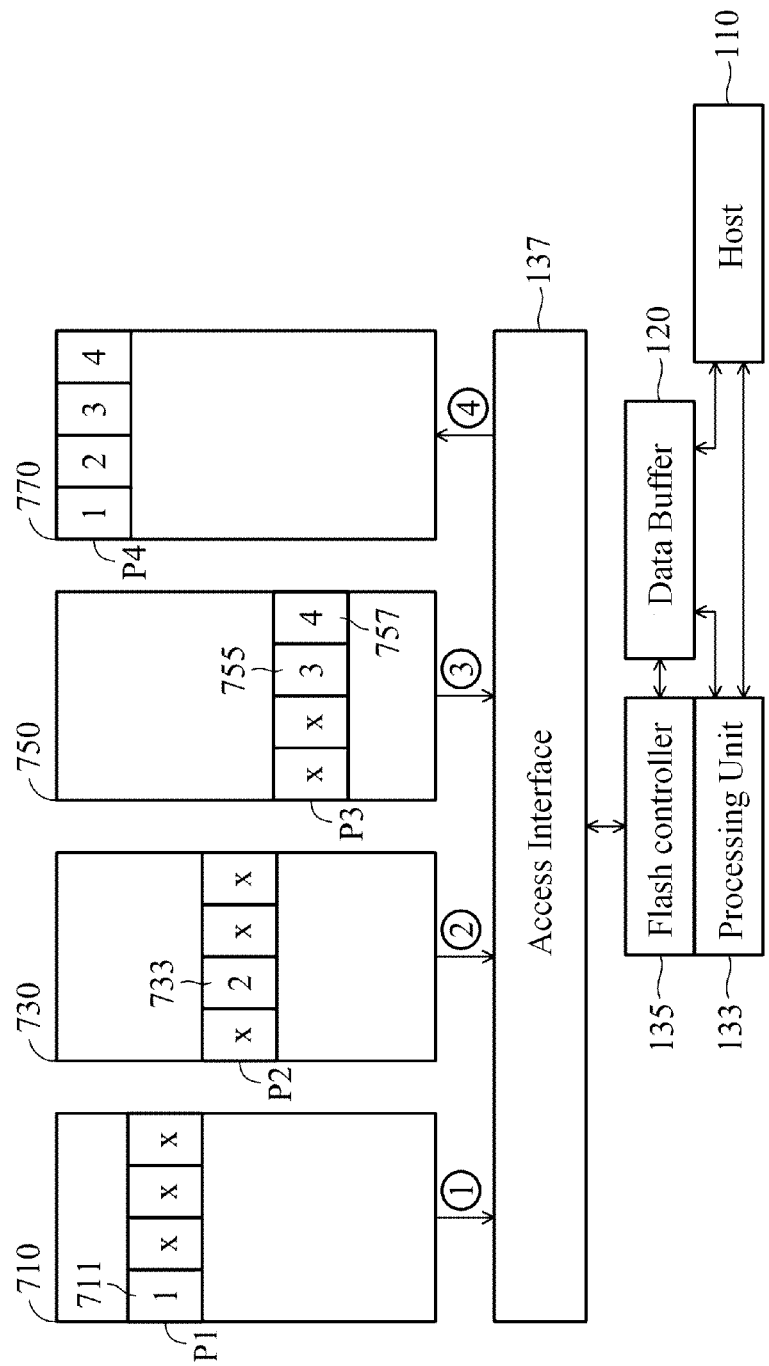
FIG. 7 is a schematic diagram of a GC process according to some implementations.

FIG. 7 is a schematic diagram of a GC process according to some implementations. Assume a physical page of a data block contains four sectors and each sector stores one transaction of user data: After numerous access, the $0^{th}$ sector 711 of the physical page P1 of the data block 710 stores valid user data and the remaining stores invalid user data. The $1^{st}$ sector 733 of the physical page P2 of the data block 730 stores valid user data and the remaining does not. The $2^{nd}$ and $3^{rd}$ sectors 755 and 757 of the physical page P3 of the data block 730 stores valid user data. In order to collect and store the valid user data of the physical pages P1 to P3 in a new physical page P4 of a physical block 770, a GC process may be performed by executing a series of read and write commands.

Figure 8:
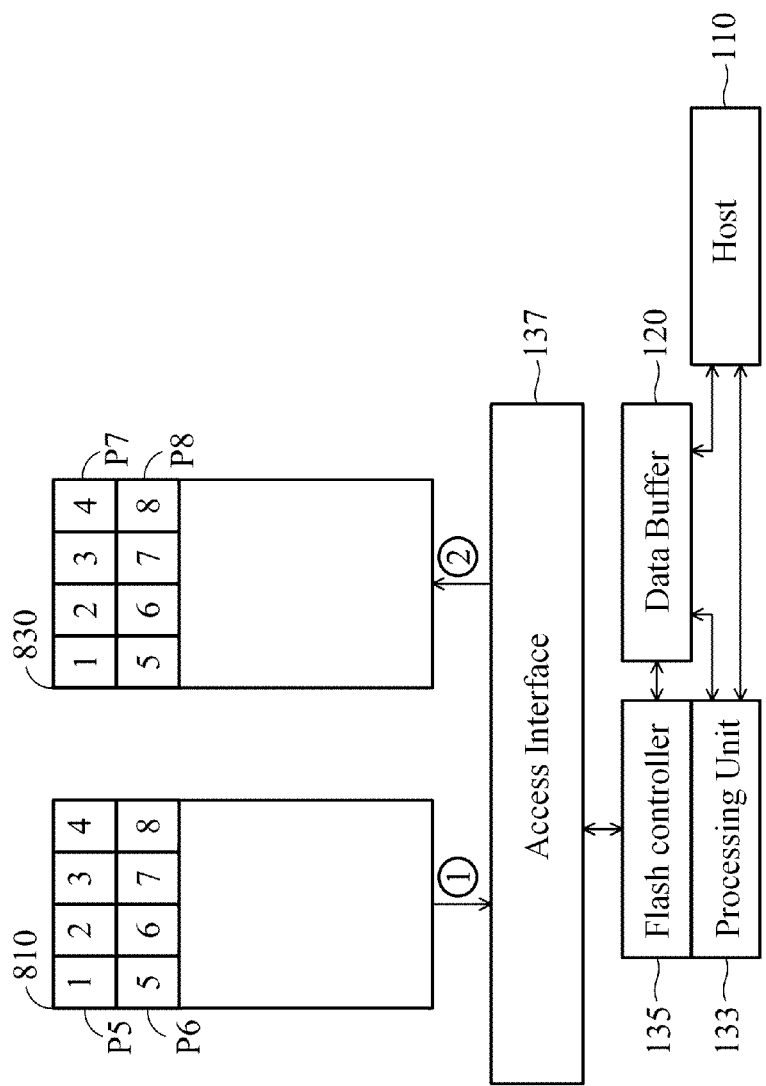
FIG. 8 is a schematic diagram of a wear leveling process according to some implementations.

Moreover, after certain times of erases (for example, 500, 1000, 5000 times, or more), a physical block of the storage unit 139 may be considered as a bad block and no longer be used because of poor data retention. To longer the service life of physical blocks, the host 110 may continuously monitor erase times for each physical block. When erase times of one data block exceed an erase threshold, the host 110 may use the aforementioned read commands to direct the processing unit 133 to read user data of this data block (source block). Then, the host 110 selects one spare block with minimum erase times as a destination block and use the aforementioned write commands to direct the processing unit 133 to program the read user data into available physical pages of the selected destination block. The aforementioned steps are referred to as a wear leveling process. FIG. 8 is a schematic diagram of a wear leveling process according to some implementations. Assume that the erase times of the data block 810 has exceeded the erase threshold and erase times of the spare block 830 is the minimum among that of all physical blocks of this I/O channel: The host 110 activates a wear leveling process to move user data of the physical pages P5 to P6 of the data block 810 to the physical pages P7 to P8 of the data block 830, in which includes a series of read and write commands.

Moreover, the host 110 may record read times for each data block and take the read times into account to determine whether to activate a wear leveling process. For example, in one month, the read times of the data block 810 are minimum and erase times thereof does not exceed the erase threshold. The host 110 may select one with the maximum erase times among that of all spare blocks, or all spare blocks of the same I/O channel, such as the spare block 830, as a destination block, treat the data block 810 as a source block, and activate a wear leveling process to move user data (or so-called cold data) of the data block 810 to the spare block 830, in which includes a series of read and write commands.

However, the uses of the aforementioned read and write commands in a GC or wear leveling process may consume excessive space of the queue 115 to store a series of read, write commands and CEs, excessive bandwidth of the data buffer 120 to receive the data read from the storage unit 139 and transmit the data to be programmed into the storage unit 139, and excessive space of the data buffer 120 to buffer the data for the transceiving. Moreover, the host 110 and the processing unit 133 may also consume excessive computation resource to deal with the series of read and write commands Once the GC or wear leveling process is performing, the Open-Channel SSD 130 cannot reserve sufficient computation resource to deal with and respond to the data access commands from the host 110, resulting in the poor system performance thereof.

Figure 9:
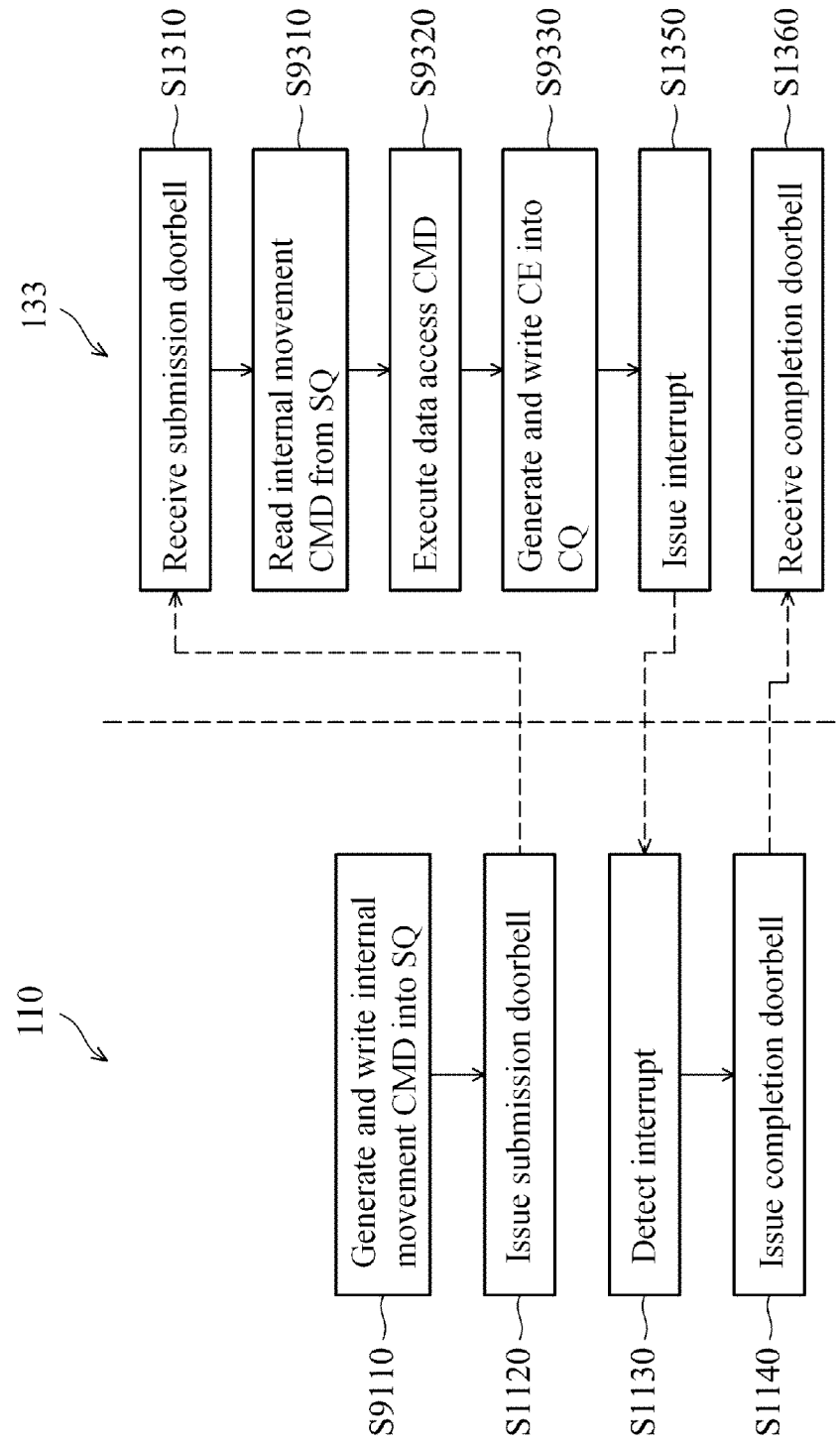
FIG. 9 is a flowchart illustrating a method for internal data movements in a flash memory according to an embodiment of the invention.

To address the drawbacks of the above implementations, embodiments of the invention introduce a method for internal data movements. The method may be suitable for a system, such as the Open-Channel SSD system 100, in which a storage mapping table is maintained by the host 110. FIG. 9 is a flowchart illustrating a method for internal data movements in a flash memory according to an embodiment of the invention. The host 110 may periodically monitor a usage status for each I/O channel, such as a quantity of available spare blocks, erase or read times for each physical block, etc. When detecting that a usage-status for an I/O channel of the Open-Channel SSD 130 has met a data-movement condition, the host 110 may generate and write an internal movement command into the SQ 510 (step S9110), to direct the Open-Channel SSD 130 to move user data of a source block of a particular I/O channel to a destination block of the same I/O channel. The data-movement condition may be met when a quantity of spare blocks is fewer than a spare threshold, or erase or read times of a data block (source block) is greater than an erase or read threshold. In addition, it may be preferred to move valid user data to a destination block only. But, it is feasible to move the whole user data to a destination block when most of the user data is valid, or for gaining better performance.

After writing the internal movement command into the SQ 510 (step S1110), the host 110 may issue a submission doorbell to the processing unit 133 (step S1120) to inform the processing unit 133 that a data access command has been written into the SQ 510. After receiving the submission doorbell (step S1310), the processing unit 133 may read the internal movement command from the SQ 510 (step S9310) and drive the flash controller 135 to activate a CopyBack procedure to move user data between a source block and a destination block of the designated I/O channel by driving the access interface 137 according to the internal movement command (step S9320). In the idea case, the earliest arrived data access command read by the processing unit 133 in step S9310 is the internal movement command But, the processing unit 133 may read and execute the internal movement command in step S9310 after a period of time for processing the other commands when the SQ 510 has stored the commands arrived earlier than the internal movement command Although the embodiments described in FIG. 9 do not illustrate the reads and executions of the earlier arrived commands, the invention should not be limited thereto. After the copyback procedure has been performed completely, the processing unit 133 may write a CE into the CQ 530 (step S9330) to inform the host 110 that the internal data-movement operation has been performed completely. In step S1130, the host may execute an Interrupt Service Routine (ISR) to read the CE from the CQ 530 and update the storage mapping table in response to the performed internal data-movement operation. For example, a physical address (i.e. the source block) originally associated with a LBA of the storage mapping table is updated with a new physical address (i.e. the destination block). In the idea case, the earliest arrived acknowledgement read by the processing unit 133 in step S1130 corresponds to the internal movement command But, the processing unit 133 may read the acknowledgement corresponding to the internal movement command and accordingly update the storage mapping table in step S1130 after a period of time for processing the other acknowledgements when the CQ 530 has stored the acknowledgements arrived earlier than that corresponding to the internal movement command Although the embodiments described in FIG. 9 do not illustrate the operations for the earlier arrived acknowledgements, the invention should not be limited thereto. In alternative embodiments, the host 110 may update the storage mapping table in or before step S9110, rather than in or after step S1130. In alternative embodiments, the host 110 in step S1130 may further determine whether the destination block is full and written the EOB information. If so, the storage mapping table is updated. Otherwise, the storage mapping table maintains.

Figure 10:
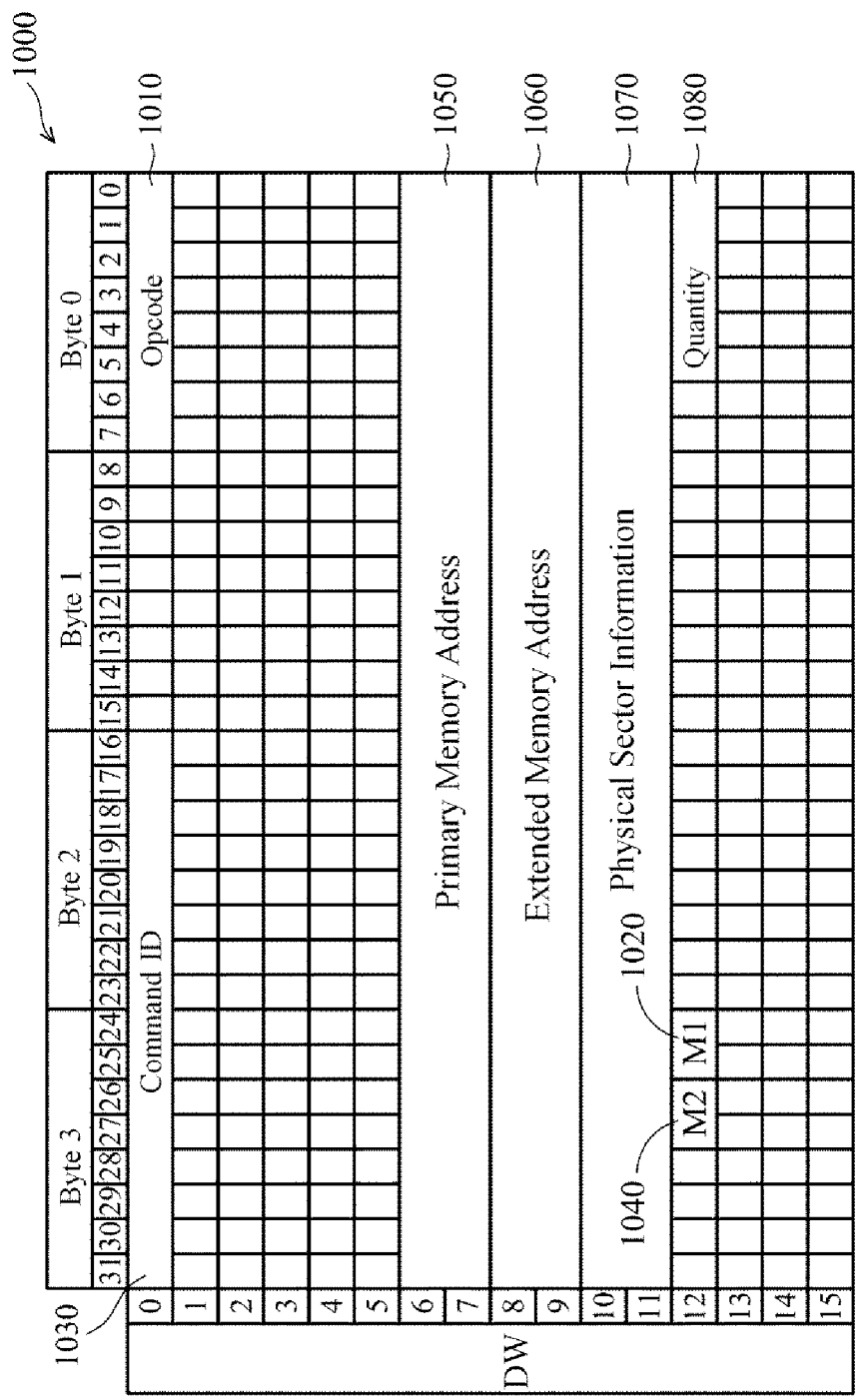
FIG. 10 shows the data format of an internal movement command according to an embodiment of the invention.

The internal movement command may be defined in the structured format. FIG. 10 shows the data format of an internal movement command according to an embodiment of the invention. The internal movement command 1000 may be a 64-Byte command. The $0^{th}$ byte of the $0^{th}$ double word (DW) of an internal movement command 1000 records an opcode 1010 to inform the Open-Channel SSD 130 of an internal movement command 1000. The $2^{nd}$ to $3^{rd}$ bytes of the $0^{th}$ DW thereof record a command identifier 1030 preferably being generated in time order, that is used to identify one internal movement command 1000 and make one relevant CE of the CQ 530 to be associated with the internal movement command 1000. Although a sector is the basic unit utilized in the internal movement command 1000 to advise the Open-Channel SSD 130 to perform an internal data-movement operation in a designated I/O channel, those artisan may modify the basic unit depend on different requirements and the invention should not be limited thereto.

The $0^{th}$ to $5^{th}$ bytes of the $12^{th}$ DW of the internal movement command 1000 record a moved-sector quantity 1080, 64 at most. Therefore, one internal movement command 1000 may advise the Open-Channel SSD 130 to move user data of at most 64 sectors of a designated I/O channel in a data movement operation.

The $10^{th}$ to $11^{th}$ DWs of the internal movement command 1000 record physical sector information 1070. If a physical address of a physical block is expressed in 32 bits and a value of the moved-sector quantity 1080 is 1, then the $10^{th}$ DW of the internal movement command 1000 records a sector address (source address) of a source block has stored user data to be moved and the $11^{th}$ DW of the internal movement command 1000 records a sector address (destination address) of a destination block. Through the CopyBack procedure, the processing unit 133 may program the user data of the source address into the destination address.

Pairings of the source and destination addresses may be referred to as data-movement records and are stored in the data buffer 120 by the host 110 before step S1120. If a physical address of a physical block is expressed in 64 bits and a value of the moved-sector quantity 1080 is greater than 1, then the physical sector information 1070 records a memory address of the data buffer 120, pointing to the first data-movement record (that is, the first pairing of the source and destination addresses), meanwhile, the source addresses and destination addresses are stored in the data buffer 120 in pairs. In step S9310, the processing unit 133 may read the interval movement command 1000 from the SQ 510, obtain pairings of the source addresses and the destination addresses according to the physical sector information 1070 and the value of the moved-sector quantity 1080 and program the user data of the source addresses into the designated destination addresses through the CopyBack procedure.

In alternative embodiments, the $6^{th}$ to $7^{th}$ DWs of the internal movement command 1000 may record a primary memory address 1050 by a Physical Region Page (PRP) entry or a Scatter Gather List (SGL) and the $8^{th}$ to $9^{th}$ DWs of the internal movement command 1000 may record an extended memory address 1060 by a PRP entry or a SGL. When a value of the moved-sector quantity is greater than 1, the physical sector information 1070 may record the first source address and the primary memory address 1050 may store the first destination address. In alternative embodiments, the primary memory address 1050 may record the first pairing of the source address and the destination address, and the extended memory address 1060 may record the remaining pairing(s) of the source address(es) and the destination address(es) if the space of the primary memory address 1050 is insufficient to record all pairings of the source addresses and the destination addresses.

The $24^{th}$ to $25^{th}$ bits of the $12^{th}$ DW of the internal movement command 1000 record a programming mode (M1) 1020 and the $26^{th}$ to $27^{th}$ bits of the $12^{th}$ DW thereof record a read mode (M2) 1040. The programming and read modes may individually include two states: for example, a default mode and a SLC mode. When it indicates the SLC mode, the processing unit 133 may drive the flash controller 135 to read or program one page of data in the SLC mode through the access interface 137. When it indicates the default mode, the processing unit 133 may drive the flash controller 135 to read or program one page of data in the default mode through the access interface 137. The default mode may be, for example, the TLC mode and the page may be a MSB, CSB or LSB page. In alternative embodiments, the programming mode may be configured to one of, for example, the SLC, MLC, TLC and QLC modes. The quantity of modes supported in the programming mode may be preferably related to programming means. For example, the storage unit 139 is QLC, into which a 3-Pass Programming is employed to program user data, the first pass programs a MSB page only, the second pass programs a CSB and a LSB pages and the third pass programs a TSB page. The programming mode may include three modes: the SLC mode, the TLC mode and the QLC mode (default mode). When it indicates the QLC mode, the processing unit 133 may request the flash controller 135 for programming the MSB, CSB, LSB or TSB page of user data through the access interface 137. The above settings may be applied to the read mode. Note that the settings of the read and programming mode may be different. For example, the read mode is the SLC mode while the programming mode is default mode. Assume that the storage unit 139 include QLCs, the host 110 may issue multiple internal movement commands 1000 to read four transactions of user data from a source address of a source block in the SLC mode and program the user data into a destination address of a destination block sequentially in the QLC mode.

Figure 11:
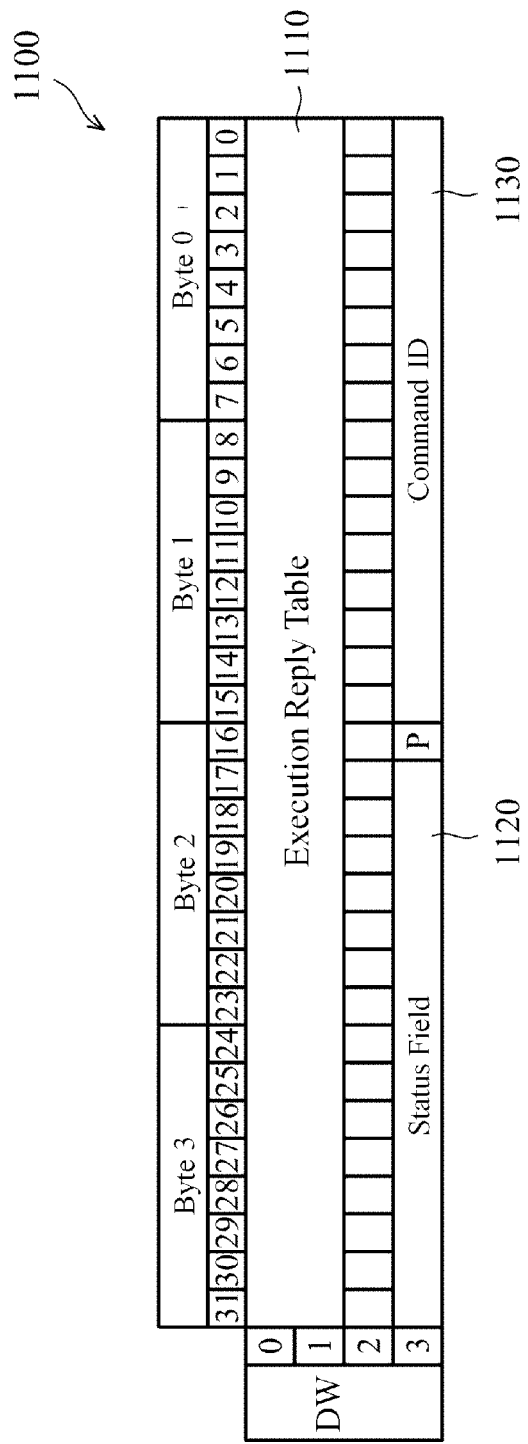
FIG. 11 shows the data format of a Completion Element (CE).

FIG. 11 shows the data format of a CE. The CE 1100 may be a 16-Byte message. The $0^{th}$ to $1^{st}$ bytes of the $3^{rd}$ DW of the CE 1100 may record a command ID 1130 and the content should be consistent with a command ID 1030 of a corresponding internal movement command 1000 to make the CE 1100 to be associated with the corresponding internal movement command 1000. The $0^{th}$ to $1^{st}$ DW of the CE 1100 may store an execution reply table 1110 for recording an access result for each transaction of user data. The $17^{th}$ to 31th bits of the $3^{rd}$ DW store a status field 1120 for recording an execution status of the internal movement command 1000.

Before step S9110, the host 110 may store multiple usage records and each record stores information about a usage-status for a physical block of a I/O channel Each time the Open-Channel SSD 130 completely performs a data access operation, the host 110 may update the usage-status of the corresponding usage record and determine whether the usage-status has met a data-movement condition. For example, the quantity of the spare blocks of the corresponding I/O channel is decreased by one, the erase times for a physical block of the corresponding I/O channel are increased by one, or the read times for a data block of the corresponding I/O channel are increased by one, or others. In some embodiments, when the usage record indicates that the quantity of the spare blocks of the corresponding I/O channels is fewer than an spare threshold, the host 110 may activate a GC process for producing more spare blocks. In some embodiments, when the usage record indicates that the erase times of a physical block of a corresponding I/O channel is higher than an erase threshold, the host 110 may activate a wear leveling process to avoid the user data encounter a problem of data retention.

A data read or write may encounter a read or write failure. When that happens, the status field 1120 of the CE 1100 is set to "1" and the bit of the execution reply table 1110 that corresponds to the user data being encountered a read or write failure is set to "1". Meanwhile, the host 110 may first determine whether the failure has happened in a read or write, activate an error handling process, such as RAID, to fix the user data of the source address in response to the read failure, and reassign a new destination address for the user data in response to the write failure.

In view of the above discussion, if a failure happens in an internal data-movement, then the host 110 requires excessive time and computation resource to determine a root cause and correct the mistake. To address the drawbacks, in alternative embodiments, the host 110 does not determine a destination address for the user data of each source address, but the Open-Channel SSD 130 determines that instead. Then, the Open-Channel SSD 130 may store the determined destination addresses in a memory address of the data buffer 120 that is indicated by the corresponding internal movement command 1000, such as a designated memory address stored in a primary memory address 1050, an extended memory address 1060 or physical sector information 1070 thereof. Finally, the Open-Channel SSD 130 may inform the host 110 that the destination addresses have been uploaded through the CE 1100, and the host 110 may update the storage mapping table according to the stored destination addresses.

For moving multiple sectors of user data, specifically, before step S9110, the host 110 may store data-movement records recording source addresses of multiple transactions of user data in the data buffer 120, store a first memory address of the data buffer 120, that points to the first data-movement record, in one of a primary memory address 1050, an extended memory address 1060 and physical sector information 1070 of the internal movement command 1000 and store a second memory address of the data buffer 120 in another of the regions 1050 to 1070 thereof to inform the Open-Channel SSD 130 where the destination addresses can be uploaded. In step S9110, the internal movement command 1000 is written in the SQ 510. The source address may be represented by a LUN, a data plane number, a physical block number, a physical page number and a sector number. In step S9310, the processing unit 133 may read and recognize the opcode 1010 of the internal movement command 1000, read the values of the moved-sector quantity 1080, the primary memory address 1050, the extended memory address 1060, the physical sector information 1070, or any combinations thereof, and obtain the source addresses for multiple transactions of user data from the designated memory address of the data buffer 120. Then, in step S9320, the processing unit 133 may determine a destination address for each transaction of user data, for example, select an spare block with the maximum or minimum erase times as a destination block, and drive the flash controller 135 to request the designated I/O channel for performing a Copy-Back procedure for the source and destination blocks through the access interface 137. If any programming of user data into a destination address fails, the processing unit 133 may re-determine a destination address and program the user data into (the first sector of) the next page; program dummy data into all remaining pages of this physical wordline and program the user data into (the first sector of) the MSB page of the next physical wordline; or, for the source and destination blocks of the designated I/O channel, redrive the flash controller 135 to perform a CopyBack procedure to move the user data to the MSB page of the next physical wordline or program the user data into another destination block. In step S9330, after the CopyBack procedure has performed successfully, the processing unit 133 may store all destination addresses of the user data in the data buffer 120, store a memory address pointing to the first destination address of the data buffer 120 in the CE 1100, and write the CE 1100 into the CQ 530. In step S1130, after receiving the CE 1100, the host 110 may read all destination addresses from the data buffer 120 according to the values of the moved-sector quantity 1080, the primary memory address 1050, the extended memory address 1060, the physical sector information 1070, or any combinations thereof, and update the storage mapping table accordingly.

For moving one sector of user data, specifically, in step S9110, the host 110 may store a source address in physical sector information 1070 of the internal movement command 1000, set a value of the primary memory address 1050 to inform the Open-Channel SSD 130 where the destination addresses can be uploaded, and write the internal movement command 1000 in the SQ 510. In step S9310, the processing unit 133 may read the source address from the physical sector information 1070 of the internal movement command 1000, determine a destination address for the source address, and drive the flash controller 135 to request the designated I/O channel for performing a CopyBack procedure through the access interface 137. In step S9330, after the CopyBack procedure has been performed successfully, the processing unit 133 may upload a destination address storing the user data in the memory address of the data buffer 120, that is indicated by the primary memory address 1050, and write the CE 1100 into the CQ 530. In step S1130, the host 110 read the CE 1100, read the destination address from the data buffer 120 according to the value of the primary memory address 1050 and accordingly update the storage mapping table.

Figure 12:
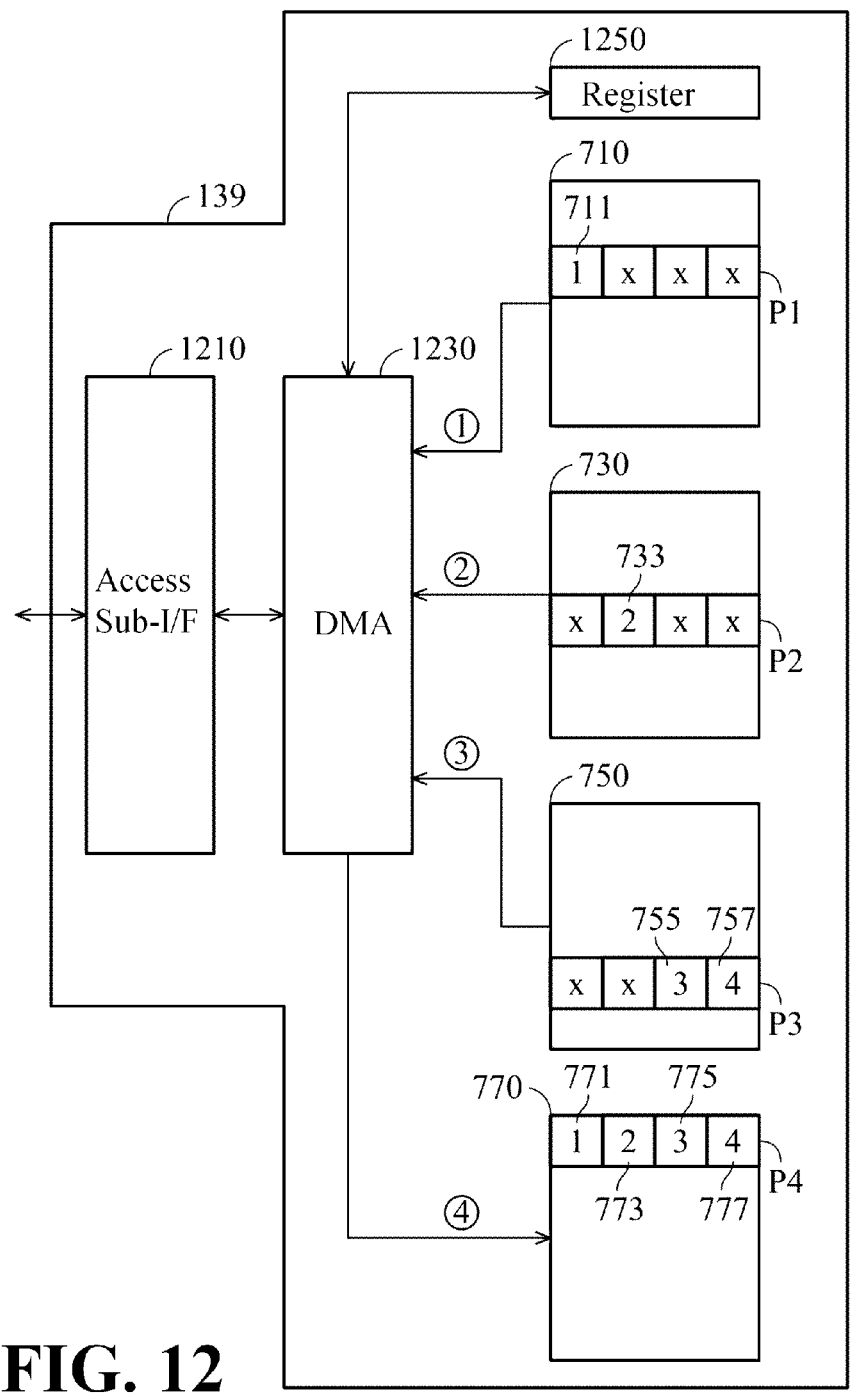
FIG. 12 is a schematic diagram illustrating internal movements for a GC process according to an embodiment of the invention.

FIG. 12 is a schematic diagram illustrating internal movements for a GC process according to an embodiment of the invention. The host 110 may write an internal movement command including physical locations represented by pairings of the source and destination sectors into the SQ 510. The first set of physical addresses includes a pairing of the source sector 711 and the destination sector 771, the second set includes a pairing of the source sector 733 and the destination sector 773, the third set includes a pairing of the source sector 755 and the destination sector 775, and the fourth set includes a pairing of the source sector 757 and the destination sector 777. Then, the flash controller 135 may drive the access sub-interface 1210 to perform a CopyBack process. The access sub-interface 1210 may request a Direct Memory Access (DMA) circuit 1230 to read data of the source sectors 711, 733, 755 and 757, store the data in a register 1250 collectively, and then, program the data of the whole physical page of the register 1250 into a physical page P4 (including the sectors 771, 773, 775 and 777) of the physical block 770.

Figure 13:
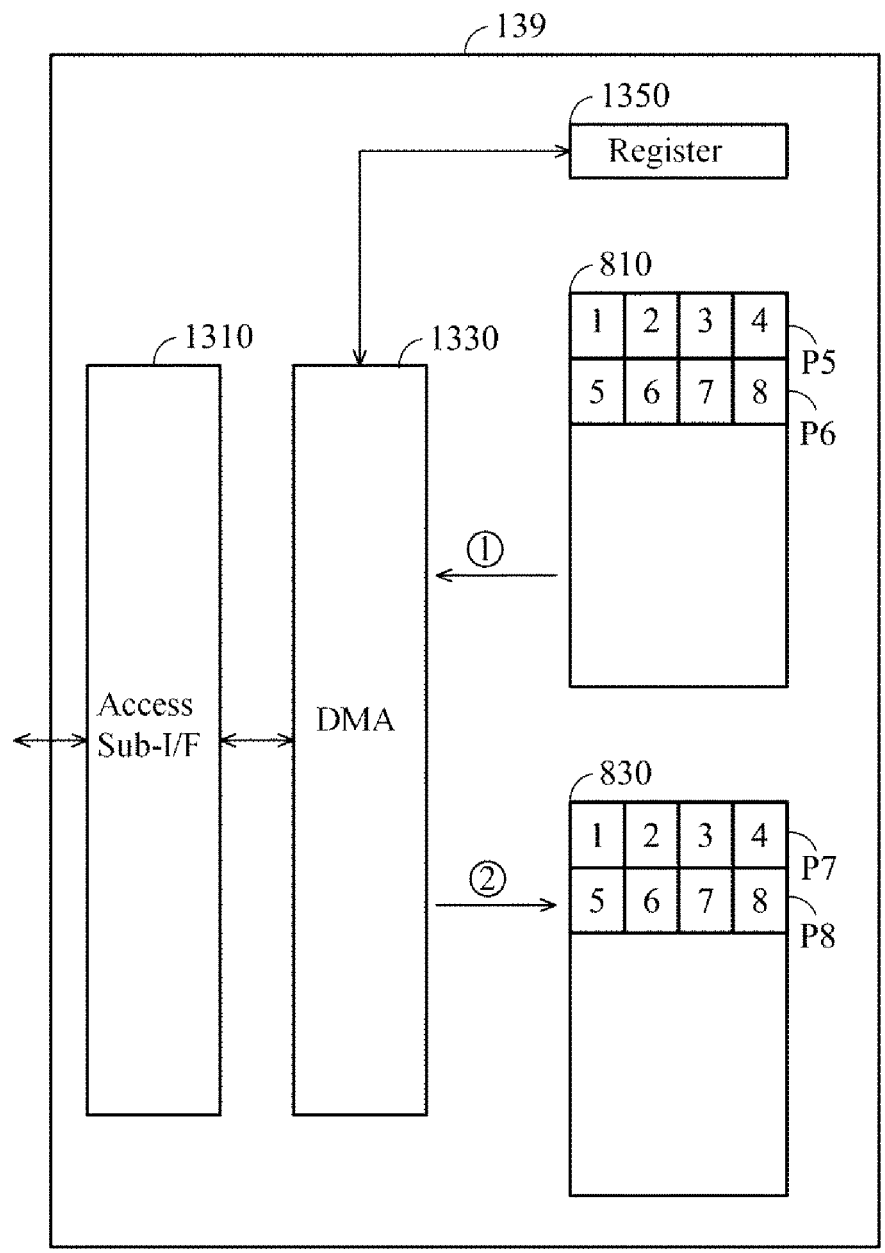
FIG. 13 is a schematic diagram illustrating internal movements for a wear leveling process according to an embodiment of the invention.

FIG. 13 is a schematic diagram illustrating internal movements for a wear leveling process according to an embodiment of the invention. The host 110 may write an internal movement command including information for physical locations represented by pairings of the source and destination sectors into the SQ 510. For example, the first set of physical addresses includes a pairing of the first source sector of the physical page P5 of the physical block 810 and the first destination sector of the physical page P7 of the physical block 830, the second set includes a pairing of the second source sector of the physical page P5 of the physical block 810 and the second destination sector of the physical page P7 of the physical block 830, and the remaining may be deduced by analogy. Then, the flash controller 135 may drive the access sub-interface 1310 to perform a CopyBack procedure. The access sub-interface 1310 may request the DMA circuit 1330 to read the data of eight source sectors of the physical pages P5 and P6, store that in the register 1350, and then, program the data of two physical pages of the register 1350 into the physical pages P7 and P8 of the physical block 830.

In the CopyBack procedure, the user data does not need to be transmitted to the data buffer 120. The flash controller 135 may output a CopyBack Read command to a source block of the storage unit 139, so as to temporarily store user data of the source address in a register (a cache or page register) of the storage unit 139. Then, the flash controller 135 may output a CopyBack Write command to a destination block of the storage unit 139, so as to program the user data of the register into a destination address. Since the user data does not need to be uploaded to the data buffer 120, no time is spent to transmit the user data of source blocks to the data buffer 120 and the user data of the data buffer 120 to destination blocks. Therefore, the system performance of the Open-Channel SSD 130 is improved to achieve the purpose of the invention.

Some or all of the aforementioned embodiments of the method of the invention may be implemented in a computer program such as an operating system for a computer, a driver for a dedicated hardware of a computer, or a software application program. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier such as a DVD, CD-ROM, USB stick, a hard disk, which may be located in a network server accessible via a network such as the Internet, or any other suitable carrier.

The computer program may be advantageously stored on computation equipment, such as a computer, a notebook computer, a tablet PC, a mobile phone, a digital camera, a consumer electronic equipment, or others, such that the user of the computation equipment benefits from the aforementioned embodiments of methods implemented by the computer program when running on the computation equipment. Such the computation equipment may be connected to peripheral devices for registering user actions such as a computer mouse, a keyboard, a touch-sensitive screen or pad and so on.

Although the embodiment has been described as having specific elements in FIGS. 1 to 3, it should be noted that additional elements may be included to achieve better performance without departing from the spirit of the invention. While the process flows described in FIGS. 6 and 9 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for internal data movements of a flash memory device, performed by a host, comprising:
   generating an internal movement command when detecting that a usage-status for an I/O channel of a solid state disk (SSD) has met a condition; and
   providing the internal movement command to direct the SSD to perform an internal data-movement operation in the designated I/O channel;
   writing the internal movement command into a submission queue (SQ); and
   issuing a submission doorbell to a processing unit of the SSD, thereby enabling the processing unit to read the internal movement command from the SQ and to request the I/O channel for performing a CopyBack procedure to move user data of a source location of the I/O channel to a destination location of the I/O channel.

2. The method of claim 1, comprising:
   before providing the internal movement command, storing a plurality of data-movement records in a data buffer, wherein each data-movement record comprises a pairing of a source location and a destination location, and any of the source location and the destination location indicates a physical page or a sector of the designated I/O channel; and
   storing a memory address pointing to a first data-movement record of the data buffer, thereby enabling the SSD to obtain the source location and the destination location from the data buffer.

3. The method of claim 2, comprising:
   after receiving a completion element (CE) corresponding to the internal movement command from the SSD, updating a storage mapping table to record which physical address of a storage unit of the SSD that user data of each logical block address (LBA) is actually stored, according to each pairing of the source location and the destination location.

4. The method of claim 1, comprising:
   before providing the internal movement command, storing a plurality of data-movement records in a data buffer, wherein each data-movement record comprises a source location and the source location indicates a physical page or a sector of the designated I/O channel; and
   storing a memory address pointing to a first data-movement record of the data buffer, thereby enabling the SSD to obtain the source location from the data buffer, determine a destination location according to the source location and store the destination address in the data buffer.

5. The method of claim 4, comprising:
   obtaining the destination location corresponding to each source location from the data buffer; and
   updating a storage mapping table to record which physical address of a storage unit of the SSD that user data of each logical block address (LBA) is actually stored, according to each pairing of the source destination and the destination location.

6. An apparatus for internal data movements of a flash memory device, comprising:
   a submission queue (SQ0);
   a host generating an internal movement command when detecting that a usage-status for an I/O channel of a solid state disk (SSD) has met a condition; and providing the internal movement command to direct the SSD to perform an internal data-movement operation in the designated I/O channel,
   wherein the host writes the internal movement command into the SQ and issues a submission doorbell to a processing unit of the SSD, thereby enabling the processing unit to read the internal movement command from the SQ and to request the I/O channel for performing a CopyBack procedure to move user data of a source location of the I/O channel to a destination location of the I/O channel.

7. The apparatus of claim 6, comprising:
   a data buffer;
   wherein the host, before providing the internal movement command, stores a plurality of data-movement records in the data buffer, wherein each data-movement record comprises a pairing of a source location and a destination location, and any of the source location and the destination location indicates a physical page or a sector of the designated I/O channel; and stores a memory address pointing to a first data-movement record of the data buffer, thereby enabling the SSD to obtain the source location and the destination location from the data buffer.

8. The apparatus of claim 7, wherein the host, after receiving a completion element (CE) corresponding to the internal movement command from the SSD, updates a storage mapping table to record which physical address of a storage unit of the SSD that user data of each logical block address (LBA) is actually stored, according to each pairing of the source location and the destination location.

9. The apparatus of claim 6, comprising:
   a data buffer;
   wherein the host, before providing the internal movement command, stores a plurality of data-movement records in a data buffer, wherein each data-movement record comprises a source location and the source location indicates a physical page or a sector of the designated I/O channel; and stores a memory address pointing to a first data-movement record of the data buffer, thereby enabling the SSD to obtain the source location from the data buffer, determine a destination location according to the source location and store the destination address in the data buffer.

10. The apparatus of claim 9, wherein the host obtains the destination location corresponding to each source location from the data buffer; and updates a storage mapping table to record which physical address of a storage unit of the SSD that user data of each logical block address (LBA) is actually stored, according to each pairing of the source destination and the destination location.

11. The apparatus of claim 6, where the usage-status for the I/O channel of the SSD has met a condition when available space of a storage unit of the SSD is insufficient.

12. The apparatus of claim 6, where the usage-status for the I/O channel of the SSD has met a condition when erase times of a physical block of the I/O channel is greater than an erase threshold.

13. An apparatus for internal data movements of a flash memory device, comprising:
   a flash controller; and
   a processing unit, coupled to the flash controller, obtaining an internal movement command generated by a host, wherein the internal movement command directs a solid state disk (SSD) to perform an internal data-movement operation in a designated I/O channel and comprises a memory address pointing to a first data-movement record of a data buffer; obtaining a plurality of data-movement records from the memory address of the data buffer, wherein each data-movement record comprises a source location; determining a destination location of the I/O channel for each source location; driving the flash controller to request the I/O channel for performing a CopyBack procedure to move user data of each source location of the I/O channel to the determined destination location; and replying to the host with the determined destination location for each source location.

14. The apparatus of claim 13, wherein the processing unit reads the internal movement command from a submission queue (SQ) after receiving a submission doorbell from the host.

15. The apparatus of claim 13, wherein the processing unit re-determines a destination location when a programing of user data into any destination location fails; and drives the flash controller to request the I/O channel for performing a CopyBack procedure to move user data of a corresponding source location to the re-determined destination location.

16. The apparatus of claim 13, wherein the processing unit stores the destination locations corresponding to all the source locations in the data buffer after performing the CopyBack procedure; stores a memory address pointing to a first destination location of the data buffer in a completion element (CE); and writes the CE into a completion queue (CQ).

* * * * *